United States Patent
Rizvi et al.

(10) Patent No.: US 11,210,857 B2
(45) Date of Patent: Dec. 28, 2021

(54) SYSTEMS AND METHODS FOR PROVIDING AN AUGMENTED-REALITY VIRTUAL TREASURE HUNT

(71) Applicant: The Toronto-Dominion Bank, Toronto (CA)

(72) Inventors: Buturab Rizvi, Toronto (CA); Mohammad Fahad Khan, Milton (CA); John Ivan Bacic, Toronto (CA); Miguel Navarro, Ewing, NJ (US); Alexandra Tsourkis, Toronto (CA)

(73) Assignee: THE TORONTO-DOMINION BANK, Toronto (CA)

(*) Notice: Subject to any disclaimer, the term of this patent is extended or adjusted under 35 U.S.C. 154(b) by 0 days.

(21) Appl. No.: 16/583,601

(22) Filed: Sep. 26, 2019

(65) Prior Publication Data

US 2021/0097761 A1  Apr. 1, 2021

(51) Int. Cl.
*G06T 19/00* (2011.01)
*A63F 13/218* (2014.01)
(Continued)

(52) U.S. Cl.
CPC .......... *G06T 19/006* (2013.01); *A63F 13/218* (2014.09); *G02B 27/017* (2013.01);
(Continued)

(58) Field of Classification Search
CPC .. A63F 13/5375; A63F 13/5378; A63F 13/61; A63F 13/822; A63F 13/69;
(Continued)

(56) References Cited

U.S. PATENT DOCUMENTS

| 6,102,406 A | 8/2000 | Miles et al. |
| 6,932,698 B2 | 8/2005 | Sprogis |

(Continued)

OTHER PUBLICATIONS

Dorward et al.: "Pokémon Go: Benefits, Costs, and Lessons for the Conservation Movement", A Journal of the Society for Conservation Biology, retrieved from https://onlinelibrary.wiley.com/doi/full/10.1111/conl.12326, Publication Date: Oct. 2016.

(Continued)

*Primary Examiner* — Abderrahim Merouan
(74) *Attorney, Agent, or Firm* — Rowand LLP

(57) ABSTRACT

A method for providing a treasure hunt in augmented reality includes presenting an indication of a starting point of a path through an environment that, when followed, allows a virtual gift card to be obtained. Then, as a mobile computer system travels through the environment from a location proximate the starting point, navigation indications to allow the path to be followed are presented. Presenting the navigation indications may include capturing images of portions of the environment, detecting locations corresponding to the path, modifying a captured image based on a detected location by compositing it with a navigation indication corresponding to a direction of the path; and displaying the modified captured image. That the mobile computer system has been moved to a location proximate an ending point of the path can be detected and may trigger an update to an account to associate the virtual gift card therewith.

22 Claims, 13 Drawing Sheets

(51) Int. Cl.
*H04L 29/06* (2006.01)
*G06F 3/01* (2006.01)
*G06Q 30/02* (2012.01)
*G02B 27/01* (2006.01)

(52) U.S. Cl.
CPC ......... *G06F 3/011* (2013.01); *G06Q 30/0209* (2013.01); *H04L 29/06034* (2013.01)

(58) Field of Classification Search
CPC .......... A63F 2300/8082; G06T 19/003; G06T 2200/24; G06T 19/006; G06T 2215/16; G06Q 20/321; G06Q 20/322; G06Q 20/326; G06Q 20/4016; G06K 9/00664–00704; G06K 9/00671; A61B 2019/5291; A61B 2090/365; G05D 1/0038; G05D 1/0044; G05B 2219/32246; G05B 2219/36432; G05B 2219/40131; G05B 2219/32014; G05B 2219/39449; G05B 2219/39451; G06F 3/011–015; H04M 2203/359; H04N 2201/3245; H04L 29/06034; H04L 67/38
See application file for complete search history.

(56) References Cited

U.S. PATENT DOCUMENTS

| | | | |
|---|---|---|---|
| 8,428,614 B2 | 4/2013 | Wolfe | |
| 10,203,762 B2 | 2/2019 | Bradski et al. | |
| 10,488,215 B1* | 11/2019 | Yu | G06T 19/006 |
| 10,737,169 B1* | 8/2020 | Tilaye | A63F 13/33 |
| 2007/0179867 A1* | 8/2007 | Glazer | G06Q 30/0603 |
| | | | 705/26.43 |
| 2011/0225069 A1* | 9/2011 | Cramer | G06Q 30/06 |
| | | | 705/27.1 |
| 2011/0313779 A1* | 12/2011 | Herzog | G06Q 10/10 |
| | | | 705/1.1 |
| 2012/0231887 A1 | 9/2012 | Lee et al. | |
| 2013/0173159 A1* | 7/2013 | Trum | G01C 21/3626 |
| | | | 701/533 |
| 2014/0207662 A1* | 7/2014 | Isaacson | G06Q 20/12 |
| | | | 705/39 |
| 2014/0278946 A1* | 9/2014 | Powell | G06Q 30/0261 |
| | | | 705/14.47 |
| 2015/0133209 A1* | 5/2015 | Patterson | A63F 13/69 |
| | | | 463/25 |
| 2018/0161678 A1* | 6/2018 | Snow | A63F 13/61 |
| 2018/0173388 A1* | 6/2018 | Holmes | G06F 3/0484 |
| 2018/0285942 A1* | 10/2018 | Armitage | G06Q 30/0279 |
| 2019/0107935 A1* | 4/2019 | Spivack | G06T 13/40 |
| 2019/0118076 A1 | 4/2019 | Mullen | |
| 2020/0242895 A1* | 7/2020 | Nelson | G07F 17/3211 |

OTHER PUBLICATIONS

Lee et al.: "Impact of Location-based Augmented Reality Games on People's Information Behavior: A Case Study of Pokémon GO" iConference 2017, retrieved from https://www.researchgate.net/publication/315711673_Impact_of_Location-, Publication Date: Mar. 2017.

Parket et al.: "HUNT: Scavenger Hunt with Augmented Reality", Interdisciplinary Journal of Information, Knowledge, and Management, vol. 10, pp. 21-35, retrieved from http://www.ijikm.org/Volume10/IJIKMv10p021-035Lu1580.pdf, Publication Date: Apr. 2015.

* cited by examiner

SYSTEMS AND METHODS FOR PROVIDING AN AUGMENTED-REALITY VIRTUAL TREASURE HUNT

FIELD

This relates to real-time augmented reality, and, more particularly, to providing an augmented-reality virtual treasure hunt.

BACKGROUND

A treasure hunt is a familiar fun-time pursuit to many. In a treasure hunt, a person—a "seeker" or "treasure hunter"—is seeking to find a hidden treasure. In many cases, the seeker is provided with a treasure map showing the shape of a route to the treasure. The seeker then uses the map to try and locate their prize: the treasure.

BRIEF DESCRIPTION OF THE DRAWINGS

Embodiments are described in detail below, with reference to the following drawings.

Like reference numerals are used in the drawings to denote like elements and features.

DETAILED DESCRIPTION OF EXAMPLE EMBODIMENTS

Figure 1:
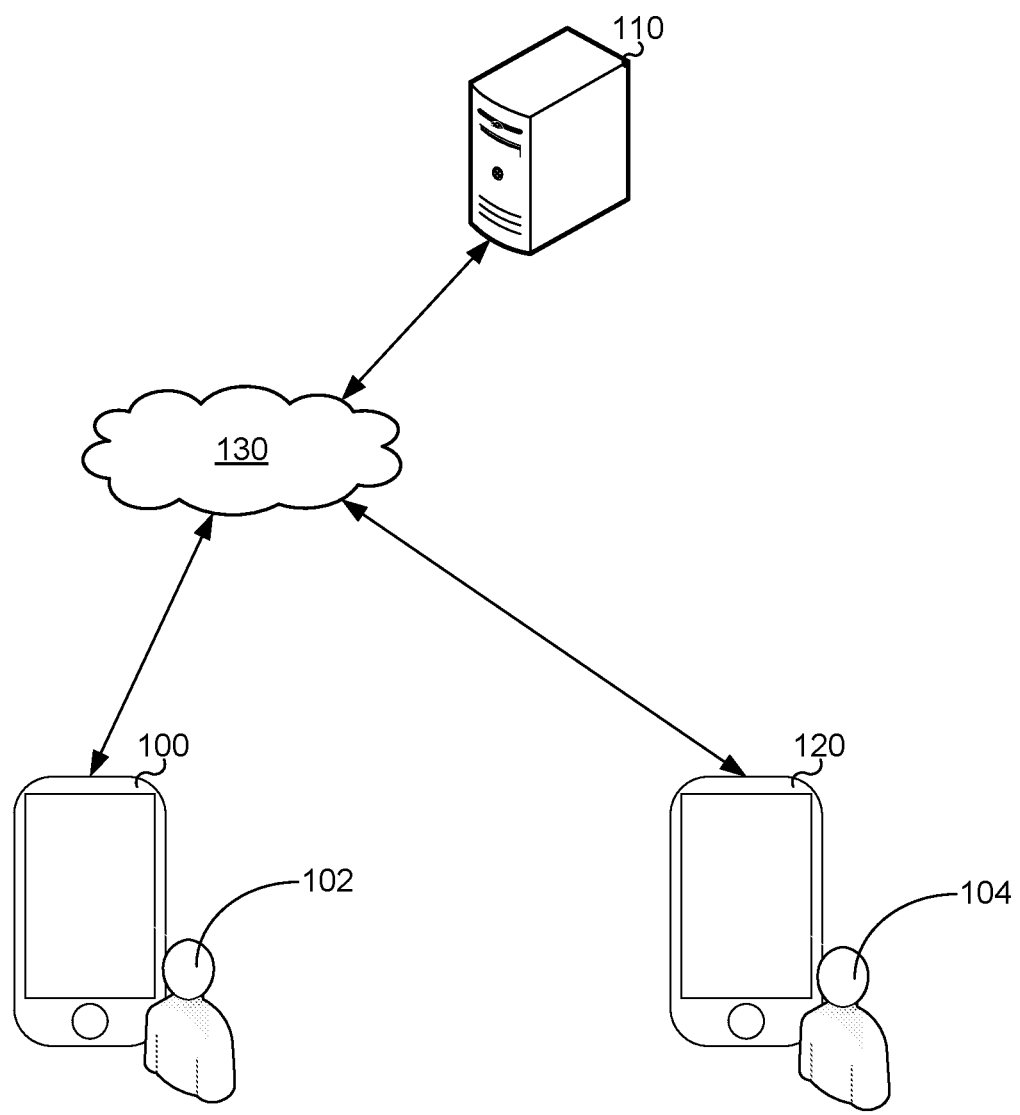
FIG. 1 is a schematic operation diagram illustrating an operating environment of an example embodiment including a pair of mobile computer systems and a server computer system.

According to the subject matter of the present application, there may be provided a mobile computer system. The mobile computer system may include a processor, an image capture module, a display module, and a memory module. One or more of the processor, the image capture module, the display module, and the memory module may be coupled to the processor. The memory may store instructions that, when executed by the processor, cause the mobile computer system to: present one or more indications of a starting point of a path to be followed through an environment to obtain a virtual gift card; and, as the mobile computer system travels through the environment from a location proximate the starting point, present navigation indications to allow the path to be followed. The presenting may include capturing, using the image capture module, images of portions of the environment; detecting locations corresponding to the path; and modifying one or more of the captured images based on the detected locations corresponding to the path. The modifying may include compositing a given captured image with a navigation indication corresponding to a direction of the path relative to a corresponding detected location corresponding to the path. The presenting may further include displaying, using the display module, the modified one or more of the captured images. The instructions when executed by the processor may further cause the mobile computer system to: detect that the mobile computer system is in a location proximate an ending point of the path; and, responsive to detecting that the mobile computer system is in the location proximate the ending point, update an account associated with the mobile computer system to associate the virtual gift card with the account.

Conveniently, in this way, a virtual treasure hunt may be provided based on an image-recognition model with the virtual gift card serving as the treasure. The image-recognition model may be a model trained based on a video captured by a mobile computer system traveling through the environment along the path corresponding to the treasure hunt as further described below.

In some implementations, the instructions, when executed by the processor, may further cause the mobile computer system to: receive data corresponding to a model for identifying locations within an environment based on images of portions of the environment. It may be that detecting locations corresponding to the path includes identifying one or more locations within the environment based on the captured images using the model. Additionally or alternatively, it may be that the mobile computer system being in the location proximate the ending point of the path is detected using the model based on at least one of the captured images of portions of the environment. Additionally or alternatively, it may be that the model for identifying locations within the environment based on images of portions of the environment was previously generated based on a video captured by another electronic device as it (the another electronic device) travelled through the environment along the path through the environment.

In some implementations, the mobile computer system may further include a location module. It may be that detecting locations corresponding to the path includes monitoring the location of the mobile computer system using the location module. Additionally or alternatively, it may be that the mobile computer system being in the location proximate the ending point of the path is detected based on the location of the mobile computer system as monitored using the location module.

In some implementations, the navigation indications may include arrows indicating a direction to next travel to follow the path.

In some implementations, the instructions, when executed by the processor, may further cause the mobile computer system to: responsive to detecting that the mobile computer system is in the location proximate the ending point, display, using the display module, an animation.

In some implementations, the instructions, when executed by the processor, may further cause the mobile computer system to: display, using the display module, a map depicting at least the ending point of the path. For example, it may be that the map was previously generated based on location data previously collected by another electronic device as it (the another electronic device) travelled through the environment along the path through the environment.

In some implementations, updating the account associated with the mobile computer system to associate the virtual gift card with the account may include adding the virtual gift card to the virtual wallet.

According to the subject matter of the present application, there may be provided a computer-implemented method. The method may include presenting one or more indications of a starting point of a path to be followed through an environment to obtain a virtual gift card; and, as a mobile computer system travels through the environment from a location proximate the starting point, presenting navigation indications to allow the path to be followed. The presenting may include: capturing, by the mobile computer system, images of portions of the environment; detecting locations corresponding to the path; and modifying one or more of the captured images based on the detected locations corresponding to the path. The modifying may include compositing a given captured image with a navigation indication corresponding to a direction of the path relative to a corresponding detected location corresponding to the path. The presenting may further include displaying, using a display of the mobile computer system, the modified one or more of the captured images. The method may further include detecting that the mobile computer system is in a location proximate an ending point of the path; and, responsive to detecting that the mobile computer system is in the location proximate the ending point, updating an account associated with the mobile computer system to associate the virtual gift card with the account.

In some implementations, the method may further include receiving data corresponding to a model for identifying locations within an environment based on images of portions of the environment. It may be that detecting locations corresponding to the path includes identifying one or more locations within the environment based on the captured images using the model. For example, it may be that the mobile computer system being in the location proximate the ending point of the path is detected using the model based on at least one of the captured images of portions of the environment. Additionally or alternatively, it may be that the model for identifying locations within the environment based on images of portions of the environment was previously generated based on a video captured by another electronic device as it travelled through the environment along the path through the environment.

In some implementations, it may be that detecting locations corresponding to the path includes monitoring the location of the mobile computer system using a location module of the mobile computer.

In some implementations, the method may further include, responsive to detecting that the mobile computer system is in the location proximate the ending point, displaying, using the display, an animation.

In some implementations, it may be that the account corresponds to a virtual wallet and updating the account associated with the mobile computer system to associate the virtual gift card with the account may include adding the virtual gift card to the virtual wallet.

According to the subject matter of the present application, there may be provided a computer-readable medium storing instructions that, when executed by a processor of a mobile computer system cause the mobile computer system to perform the above-described method. In some implementations, the computer-readable medium may be a non-transitory computer-readable storage medium.

According to the subject matter of the present application, there may be provided a computer-readable medium storing instructions. The computer-readable medium may be a non-transitory computer-readable storage medium. The computer-readable medium may store instructions that, when executed by a processor of a mobile computer system, cause the computer system to: present one or more indications of a starting point of a path to be followed through an environment to obtain a virtual gift card; and, as the mobile computer system travels through the environment from a location proximate the starting point, present navigation indications to allow the path to be followed. The presenting may include: capturing images of portions of the environment; detecting locations corresponding to the path; and modifying one or more of the captured images based on the detected locations corresponding to the path. It may be that the modifying includes compositing a given captured image with a navigation indication corresponding to a direction of the path relative to a corresponding detected location corresponding to the path. The presenting may further include displaying the modified one or more of the captured images. The instructions, when executed, may further cause the computer system to: detect that the mobile computer system is in a location proximate an ending point of the path; and, responsive to detecting that the mobile computer system is in the location proximate the ending point, update an account associated with the mobile computer system to associate the virtual gift card with the account.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, a first mobile computer system 100, a server computer system 110, and a second mobile computer system 120 communicate via a network 130.

The first mobile computer system 100 and the second mobile computer system 120 are mobile computing devices. Each may, as illustrated, be a smart phone. However, one or both of the first mobile computer system 100 and the second mobile computer system 120 may be a computing device of another type such as, for example, a personal computer, a laptop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The first mobile computer system 100 is associated with a first person 102. The first person 102 may be a person setting/defining a treasure hunt for completion by one or more others. As further described below, the first person 102 may use the first mobile computer system 100 to configure a treasure hunt and/or to select and/or fund a virtual good that will serve as the treasure that can be obtained by completing the treasure hunt.

The second mobile computer system 120 is associated with a second person 104. The second person 104 may be a seeker attempting the treasure hunt. Completing the treasure hunt may, for example, allow the second person 104 to obtain a virtual good associated with the treasure hunt. As further described below, the second mobile computer system 120 may guide the second person 104 in relation to the treasure hunt—i.e., the second mobile computer system 120 may provide guidance for completing the treasure hunt.

As further described the first mobile computer system 100 and the second mobile computer system 120 may, at various times and, potentially, at the same time, be in the same environment. However, they may also not be in that environment at the same time as further described below. For example, the first mobile computer system 100 may be in the environment at a first time related to the defining of the treasure hunt through the environment and the second mobile computer system 120 may be in that same environment at a second, later time in order to provide guidance in relation to the treasure hunt.

The server computer system 110 is a computer server. Such a computer system may, for example, be a mainframe computer, a minicomputer, or the like. In some implementations thereof, a computer server system may be formed of or may include one or more computing devices. A computer server system may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The server computer system 110 may be in a location geographically disparate from the aforementioned environment. Put differently, the environment including one or both of the first mobile computer system 100 and the second mobile computer system 120 may be remote from the server computer system 110 and vice-versa.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, or the like.

As further described below, the first mobile computer system 100 may co-operate with the server computer system 110 via the network 130 in order to define the aforementioned treasure hunt and to generate one or more models for identifying locations along the path of the treasure hunt such as, for example, an image-recognition model for recognizing portions of the environment corresponding to positions along the treasure hunt. Additionally or alternatively, the second mobile computer system 120 may co-operate with the server computer system 110 via the network 130 in order to provide guidance in relation to the treasure hunt. In particular, as further described below, the second mobile computer system 120 may be adapted to present augmented reality environments corresponding to treasure hunts. Augmented reality is a specialized form of virtual reality in which graphic objects in a virtual-reality environment are related to objects in a real-world scene or environment and are presented in real-time as that real-world environment is captured using an image capture module.

Figure 2B:
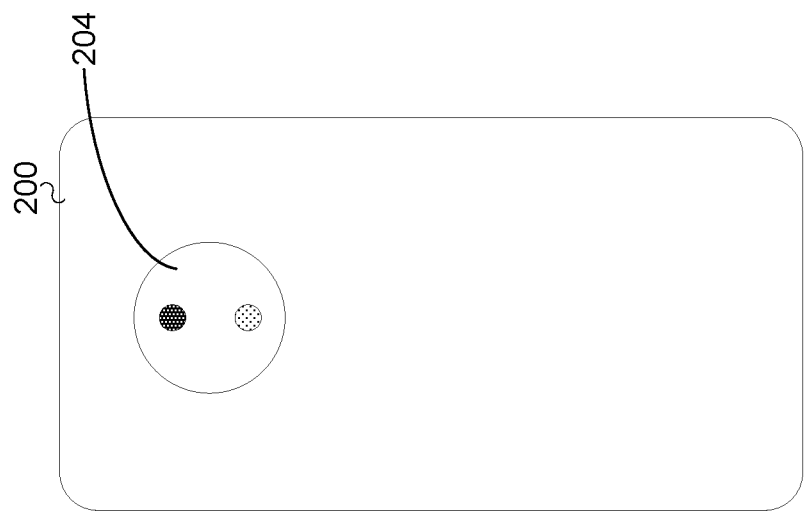
FIGS. 2A and 2B show the front and back of an example mobile computer system, respectively.
Figure 2A:
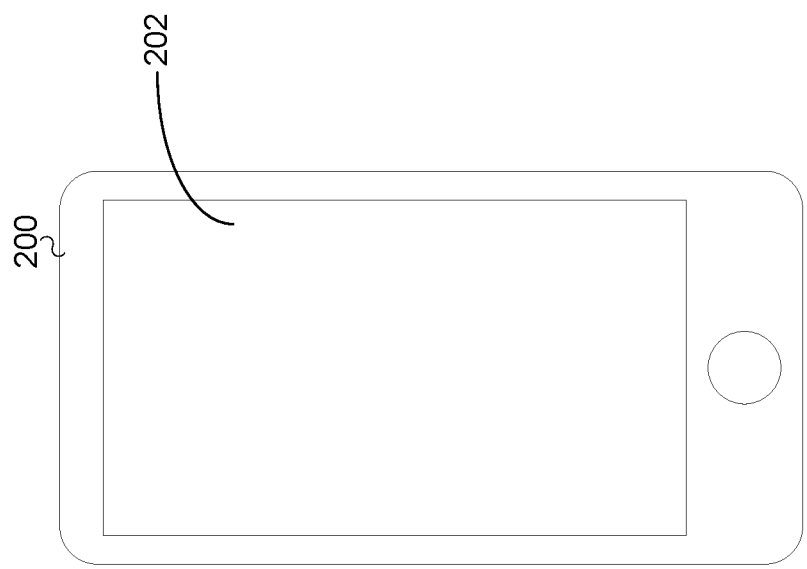

FIGS. 2A and 2B show the front and back of the example mobile computer system 200, respectively. The example mobile computer system 200 may, in some embodiments, be a smartphone as shown in FIGS. 2A and 2B. In other embodiments, the example mobile computer system 200 may be another form of mobile computing device such as, for example, a tablet.

In some implementations, instances of the example mobile computer system 200 may serve as the first mobile computer system 100 and/or the second mobile computer system 120.

Referring now to FIG. 2A, the front of the example mobile computer system 200 includes a display 202. The display 202 is a module of the example mobile computer system 200. The display 202 is for presenting graphics. The display 202 may be, for example, a liquid crystal display (LCD). In addition to being an output device, the display 202 may also be an input device. For example, the display 202 may allow touch input to be provided to the example mobile computer system 200. In other words, the display 202 may be a touch sensitive display module. In a particular example, the display 202 may be a capacitive touch screen.

Referring to FIG. 2B, the rear of the example mobile computer system 200 includes a camera 204. The camera 204 is an image capture module. The camera 204 is for capturing images of the environment of the example mobile computer system 200. The camera 204 may incorporate a digital image sensor such as, for example, a charge coupled device (CCD) or a complementary metal-oxide-semiconductor (CMOS) image sensor.

Figure 3:
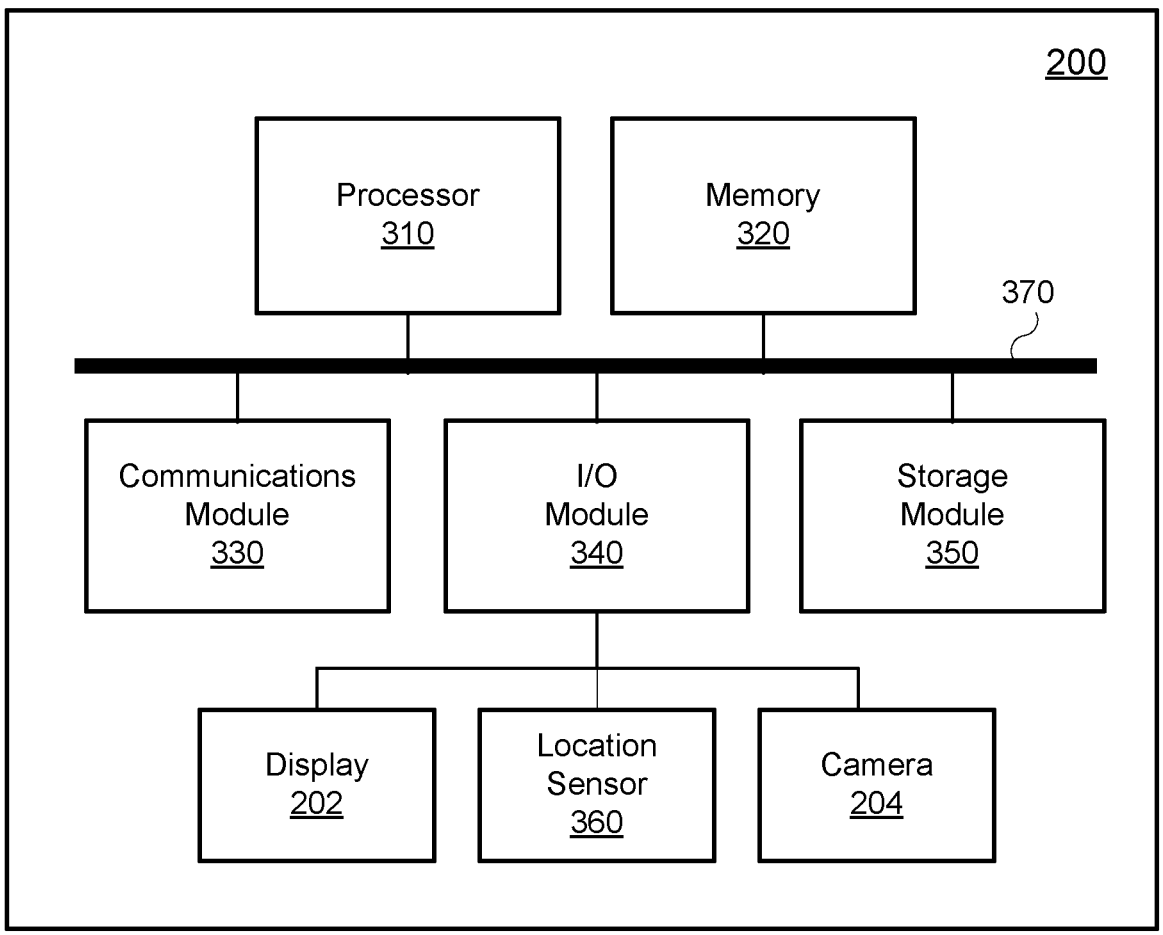
FIG. 3 is a high-level schematic diagram of the example mobile computer system of FIGS. 2A and 2B.

FIG. 3 is a high-level schematic diagram of the example mobile computer system 200. The example mobile computer system 200 includes a variety of modules. For example, as illustrated, the example mobile computer system 200 may include a processor 310, a memory 320, a communications module 330, an I/O module 340, and/or a storage module 350. As illustrated, the foregoing example modules of the example mobile computer system 200 are in communication over a bus 370.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example mobile computer system 200.

The communications module 330 allows the example mobile computer system 200 to communicate with other computing devices and/or various communications networks such as, for example, the network 130. For example, the communications module 330 may allow the example mobile computer system 200 to send or receive communications signals. Communications signals may be sent or received according to one or more protocols or according to one or more standards. The communications module 330 may allow the example mobile computer system 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example mobile computer system 200 to communicate using near-field communication (NFC), via Wi-Fi™, using Bluetooth™ or via some combination of one or more networks or protocols. In some embodiments, all or a portion of the communications module 330 may be integrated into a component of the example mobile computer system 200. For example, the communications module 330 may be integrated into a communications chipset.

The I/O module 340 is an input/output module. The I/O module 340 allows the example mobile computer system 200 to receive input from and/or to provide input to components of the example mobile computer system 200 such as, for example, various input modules and output modules. For example, the I/O module 340 may, as shown, allow the example mobile computer system 200 to receive input from and/or provide output to the display 202 and/or the camera 204.

Additionally, the I/O module 340 may receive input from a location sensor 360. The location sensor 360 may allow a geographic location of the example mobile computer system 200 to be ascertained. For example, the location sensor 360 may utilize and may include or may interact with a receiver of one or more satellite-based location systems, such as, for example, global positioning satellite (GPS), GLONASS, BeiDou Navigation Satellite System (BDS), and/or Galileo in order to locate the example mobile computer system 200. Additionally or alternatively, the location sensor 360 may employ other techniques/technologies for geographic location determination such as, for example, cell-tower triangulation and/or the use of wireless (e.g., Wi-Fi™) hotspot location data. In some embodiments, the location sensor 360 may be omitted and the function of the location sensor 360 may be performed by or using other components of the example mobile computer system 200. In a particular example, a geographic location may be determined using the communications module 330 such as, for example, where cell-tower triangulation and/or wireless hotspot location data is employed in determining location.

The storage module 350 allows data to be stored and retrieved. In some embodiments, the storage module 350 may be formed as a part of the memory 320 and/or may be used to access all or a portion of the memory 320. Additionally or alternatively, the storage module 350 may be used to store and retrieve data from persisted storage other than the persisted storage (if any) accessible via the memory 320.

In some embodiments, the storage module 350 may be used to store and retrieve data in/from a database. A database may be stored in persisted storage. Additionally or alternatively, the storage module 350 may access data stored remotely such as, for example, as may be accessed using a local area network (LAN), wide area network (WAN), personal area network (PAN), and/or a storage area network (SAN). In some embodiments, the storage module 350 may access data stored remotely using the communications module 330. In some embodiments, the storage module 350 may be omitted and its function may be performed by the memory 320 and/or by the processor 310 in concert with the communications module 330 such as, for example, if data is stored remotely.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
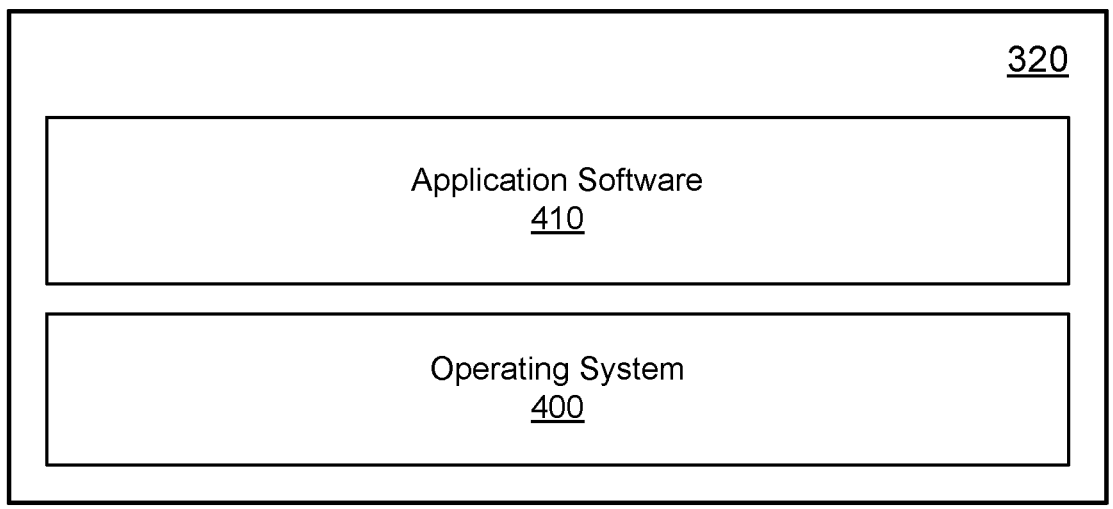
FIG. 4 shows a simplified organization of software components stored in a memory of the example mobile computer system of FIGS. 2A and 2B.

FIG. 4 depicts a simplified organization of software components stored in the memory 320 of the example mobile computer system 200. As illustrated, these software components include an operating system 400 and an application software 410.

The operating system 400 is software. The operating system 400 allows the application software 410 to access the processor 310 (FIG. 3), the memory 320, the communications module 330, the I/O module 340, and the storage module 350 of the example mobile computer system 200. The operating system 400 may be, for example, Google™ Android™, Apple™ iOS™, UNIX™, Linux™, Microsoft™ Windows™, Apple OSX™ or the like.

The application software 410 adapts the example mobile computer system 200, in combination with the operating system 400, to operate as a device for defining a virtual treasure hunt or as a device for providing guidance related to completion of a previously-defined virtual treasure hunt.

Where the example mobile computer system 200 is a smartphone or tablet, the application software 410 may be or may be a part of a smartphone or tablet application or "app". In a particular example, the application software 410 may be a part of an application associated with particular provider of virtual treasure hunts. As mentioned above and further described below, in some embodiments, the virtual treasure hunt may offer a virtual good as the treasure. In some such embodiments, the application software 410 may be associated with a source of virtual goods. For example, in the case where the virtual good is a virtual gift card, the application software 410 may be provided by a vendor from which virtual gift cards may be obtained. In a particular example, such a vendor may be a virtual wallet provider such as may offer virtual gift cards for sale and/or may allow virtual gift cards to be maintained in a virtual wallet for future use (e.g., in making purchases).

Figure 5:
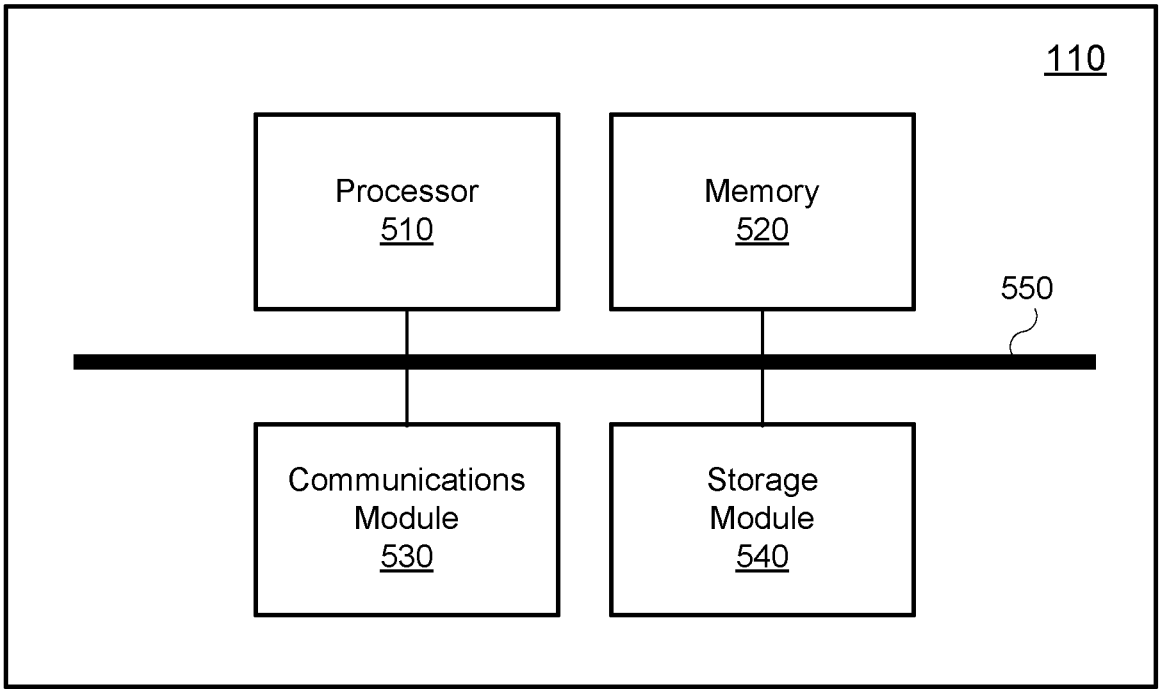
FIG. 5 is high-level schematic diagram of a server computer system.

FIG. 5 is a high-level schematic diagram of a server computer system 110.

The server computer system 110 includes a variety of modules. For example, as illustrated, the server computer system 110 may include a processor 510, a memory 520, a communications module 530, and/or a storage module 540. As illustrated, the foregoing example modules of the server computer system 110 are in communication over a bus 550.

The processor 510 is a hardware processor. The processor 510 may, for example, be one or more ARM, Intel x86, PowerPC processors or the like.

The memory 520 allows data to be stored and retrieved. The memory 520 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the server computer system 110.

The communications module 530 allows the server computer system 110 to communicate with other computing devices and/or various communications networks such as, for example, the network 130. The communications module 530 may allow the server computer system 110 to send or receive communications signals. Communications signals may be sent or received according to one or more protocols or according to one or more standards. For example, the communications module 530 may allow the server computer system 110 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 530 may allow the server computer system 110 to communicate via Wi-Fi™, using Bluetooth™ or via some combination of one or more networks or protocols. In some embodiments, all or a portion of the communications module 530 may be integrated into a component of the server computer system 110. For example, the communications module may be integrated into a communications chipset.

The storage module 540 allows the server computer system 110 to store and retrieve data. In some embodiments, the storage module 540 may be formed as a part of the memory 520 and/or may be used to access all or a portion of the memory 520. Additionally or alternatively, the storage module 540 may be used to store and retrieve data from persisted storage other than the persisted storage (if any) accessible via the memory 520. In some embodiments, the storage module 540 may be used to store and retrieve data in a database. A database may be stored in persisted storage. Additionally or alternatively, the storage module 540 may access data stored remotely such as, for example, as may be accessed using a local area network (LAN), wide area network (WAN), personal area network (PAN), and/or a storage area network (SAN). In some embodiments, the storage module 540 may access data stored remotely using the communications module 530. In some embodiments, the storage module 540 may be omitted and its function may be performed by the memory 520 and/or by the processor 510 in concert with the communications module 530 such as, for example, if data is stored remotely.

Software comprising instructions is executed by the processor 510 from a computer-readable medium. For example, software may be loaded into random-access memory from persisted storage of the memory 520. Additionally or alternatively, instructions may be executed by the processor 510 directly from read-only memory of the memory 520.

Figure 6:
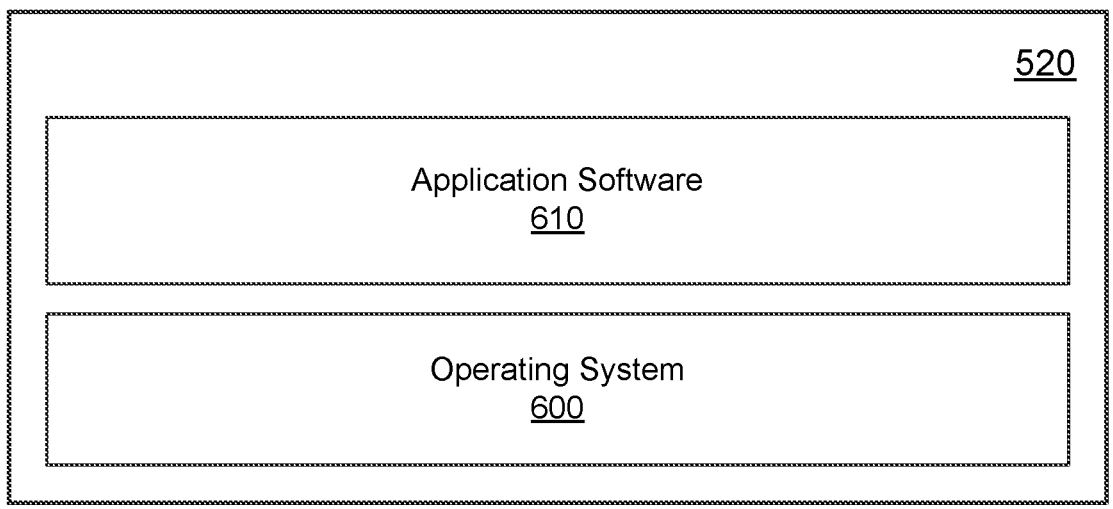
FIG. 6 shows a simplified organization of software components stored in a memory of the server computer system of FIG. 5.

FIG. 6 depicts a simplified organization of software components stored in the memory 520 of the server computer system 110. As illustrated, these software components include an operating system 600 and an application software 610.

The operating system 600 is software. The operating system 600 allows the application software 610 to access the processor 510, the memory 520, the communications module 530, and the storage module 540 of the server computer system 110. The operating system 600 may be, for example, UNIX™, Linux™, Microsoft™ Windows™, Apple OSX™ or the like.

For example, the application software 610 may cooperate with the operating system 600 to adapt a suitable embodiment of the server computer system 110 to co-operate with a mobile computing device to generate an image-recognition model for a treasure hunt and/or to provide navigation guidance related to a treasure hunt.

Figure 7:
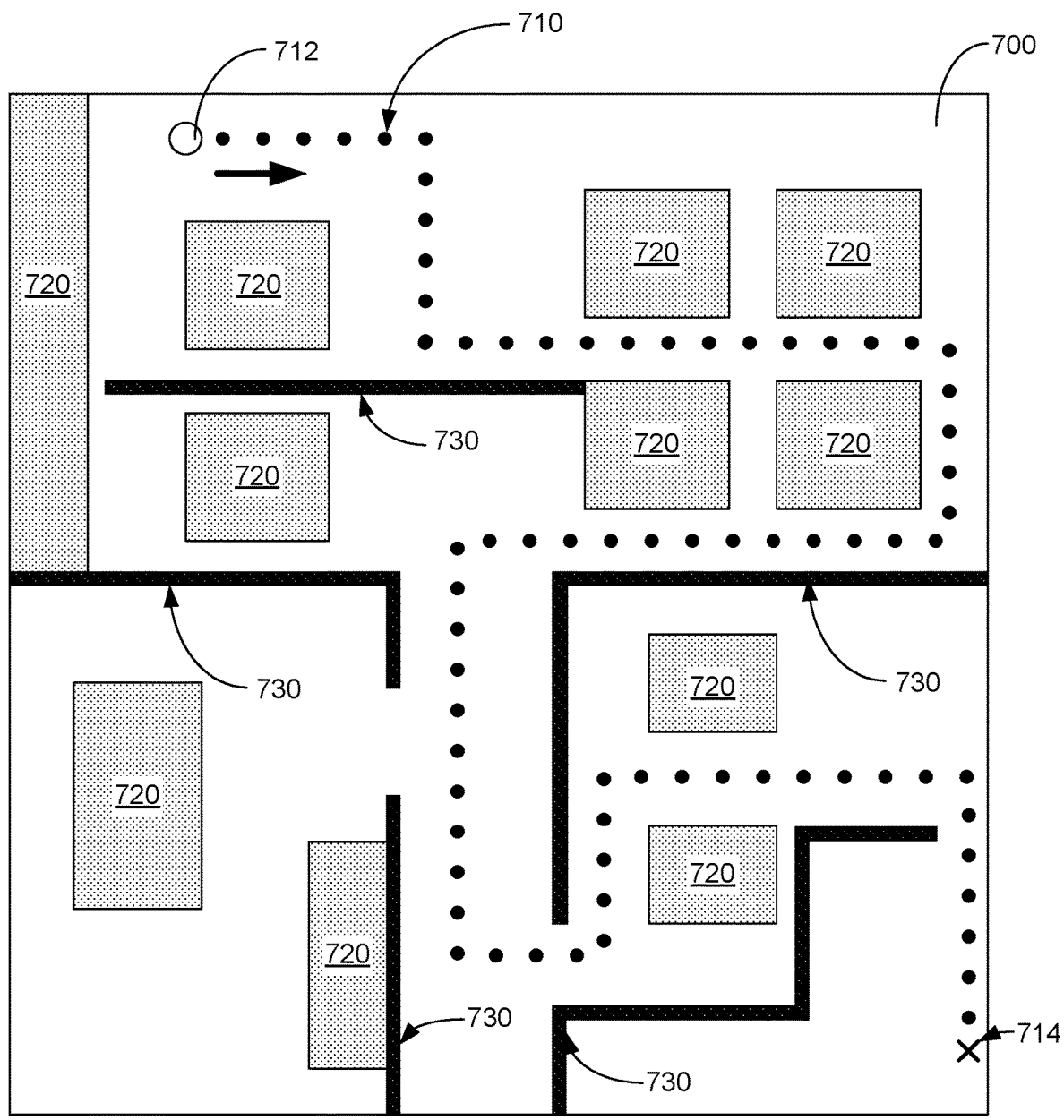
FIG. 7 is a plan view of an example environment which serves as a location for an example treasure hunt.

FIG. 7 is a plan view of an environment 700 which may serve as a location for an example treasure hunt.

As illustrated, the environment 700 is an interior environment. The environment 700 includes a number of obstacles 720 such as may, for example, correspond to items such as, for example, furniture, appliances, etc. The environment 700 is also divided into various rooms by a set of walls 730.

A path 710 through the environment 700 defines the path of a treasure hunt starting from a starting point 712 and ending at an ending point 714. Conceptually, a treasure may be located at the ending point 714, but that treasure may, in at least some embodiments, have no physical manifest and be entirely virtual. For example, the treasure may be a virtual good. Put another way, a treasure hunter or seeker may obtain the treasure by traveling in person (along with a mobile computer system) to the ending point 714 at which point an account associated with the person and/or their mobile device may be updated to associate the virtual good with the account. For example, where the virtual good is and/or includes a virtual gift card, the account may be a virtual wallet or may have a virtual wallet associated therewith and the update may add the virtual gift card to the virtual wallet.

Figure 8:
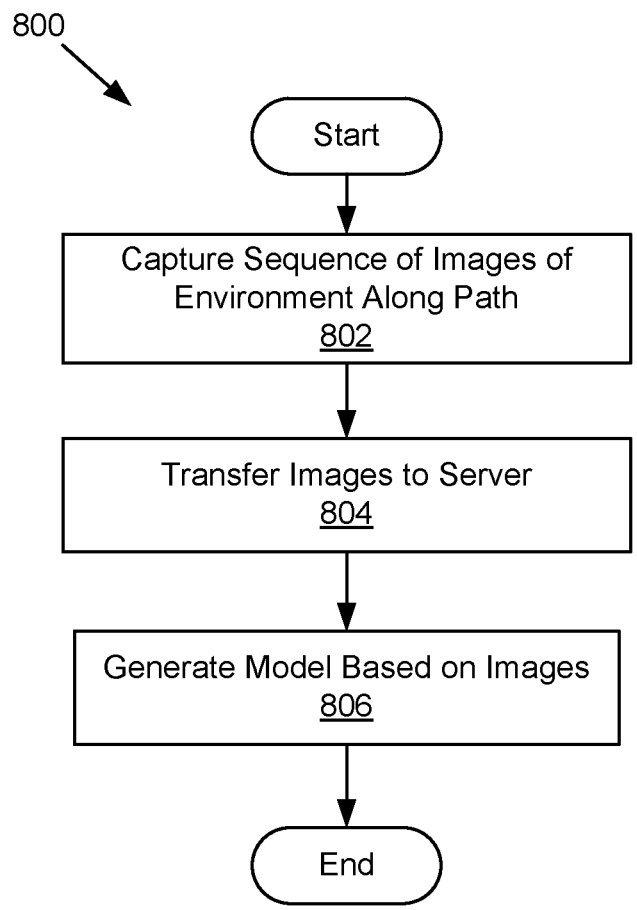
FIG. 8 is a flowchart showing operations performed in generating a model for recognizing a path corresponding to a given treasure hunt.

A method 800 for generation of an image-recognition module for a treasure hunt such as that depicted in FIG. 7 will now be described with reference to the flowchart of FIG. 8. In performing the method 800, operations starting from an operation 802 and continuing onward are performed variously by processors of the first mobile computer system 100 and the server computer system 110 executing software from their respective memories.

At the operation 802, a sequence of images of portions of the environment 700 corresponding to the path 710 are captured by the first mobile computer system 100. For example, the sequence of images may be or may correspond to a video of the example environment captured by the first mobile computer system 100 as it moves through the environment along the route of the intended treasure hunt. In particular, the sequence of images may be captured by the first mobile computer system 100 as it is carried along the path 710 through the environment such as, for example, by the first person 102. The first mobile computer system 100 may capture the images using an image capture module. For example, where the first mobile computer system 100 is an instance of the example mobile computer system 200, the images may be captured using the camera 204.

In some embodiments, in addition to capturing a sequence of images of the environment, the first mobile computer system 100 may capture location data as it travels through the environment. For example, where the first mobile computer system 100 is an instance of the example mobile computer system 200, location data may be captured using the location sensor 360. Captured location data may take a variety of forms and may, for example, include one or more of geolocation data, accelerometer data and/or data about proximity to one or more beacons in the environment.

Following the operation 802, an operation 804 is next.

At the operation 804, the first mobile computer system 100 uploads the images to the server computer system 110 by way of the network 130. The server computer system 110 may receive the transferred images via the network 130 using the communications module 530. Where the first mobile computer system 100 is an instance of the example mobile computer system 200, the communications module 330 may be employed for transferring the images to the server computer system 110. Where additional data such as, for example, location data as mentioned above, was collected during the capture of the sequence of images, some or all of that additional data may also be transferred by the first mobile computer system 100 to the server computer system 110.

Following the operation 804, an operation 806 is next.

At the operation 806, the computer server system generates one or more models for recognizing locations along the path 710. For example, the server computer system 110 may use the received images to generate an image-recognition model for recognizing locations along the path 710 based on the received images of portions of the environment 700. Such an image-recognition model may be trained using machine-learning techniques. A training set for such training may be generated based on the images of the sequence of images in a variety of manners. For example, the server may generate a training set using images of portions of the environment 700 the drawn directly from the sequence of images. Additionally or alternatively, to generate the training set, the server may modify one or more images to generate additional training data. For example, the brightness of images may be adjusted and/or portions of images may be zoomed to fill the frame. In another example, shake could be added to the sequence of images (i.e., making them a shaky "video") such as to simulate random jitter or bobbing such as may occur in a sequence of images captured by a mobile device held by a person walking. In some cases, the sequence of images may be used to form a training set by modifying some or all of the images using one or more techniques such as, the foregoing, example techniques. It may, for example, be that a given image is modified in more than one way or more than once with random parameters so that the training set may include more than one image based on the given image (e.g., the raw given image, the given image modified a first way and/or according to a first set of parameters, the given image modified a second way and/or according to a second set of parameters, etc.). More broadly, the model may take into account data other than images and/or more than one model may be generated. For example, in addition to the sequence of images, collected location data may be employed in training the model and/or in training an additional model.

However, generated, after at least one model for recognizing locations in the environment 700 along the path 710 corresponding to a planned treasure hunt has been generated, a requirement to allow the virtual treasure hunt to be initiated has been satisfied. In some embodiments, there may also be additional requirements that must be satisfied in order to allow the virtual treasure hunt. For example, there may be one or more pre-requisites associated with selection and/or purchase of a virtual good such as may serve as the treasure that will be provided upon completion of the virtual treasure hunt. In a particular example, where the virtual good is a virtual gift card, it may be that the gift card must be purchased and allocated to/associated with the treasure hunt before it can be initiated. Alternatively, it may be that the virtual good does not have to be purchased in advance but that it must be selected from amongst a set of virtual goods of various types or categories. Additionally or alternatively, it may be the virtual good does not have to be purchased in advance but that payment information to cover the cost thereof has to be provided. For example, it may be that bank account information and/or payment card information (e.g., credit card information) is collected and that that information will be used in covering the cost of purchasing the virtual good responsive to completion of the treasure hunt. Further, where such information is collected it may be that a hold (e.g., of bank account funds) and/or an authorization (e.g., against a credit card) is made/obtained using the information in an effort to ensure that the payment method will be able to cover the cost of purchasing the virtual good when the purchase is processed. Whether purchased in advance or whether merely selected in advance, it may be that the payment information that will be used to purchase the virtual good (either in advance or later such as, for example, on completion of the treasure hunt) is associated with one or both of the first person 102 and the first mobile computer system 100. For example, it may be that the payment information is associated with an account that is associated with the first person 102 and/or the first mobile computer system 100. Put another way, such an account may be employed (e.g., debited) in supplying the virtual good.

A virtual treasure hunt may be initiated in a variety of fashions. For example, it may be that an indication is sent to the second mobile computer system 120 (e.g., by the server computer system 110 such as, for example, via the network 130). Such an indication may take a variety of forms. For example, an e-mail notification including a link to initiate the virtual treasure hunt may be sent to an address associated with the second person 104 and then the second person 104 may use the second mobile computer system 120 to open that link. That link may then, for example, be opened using software that operates to provide virtual treasure hunts and/or the link may allow such software to be downloaded and executed at the second mobile computer system 120. As mentioned above and further described below, in some implementations, a treasure hunter completing a virtual treasure hunt may be provided with a virtual good. For example, an electronic coupon (e.g., for money off a particular good/goods and/or at a particular retailer/retailers), a virtual gift card (e.g., as may be spent at associated merchants), a virtual points card (such as a virtual loyalty points card) and/or points therefor, an electronic money transfer (e.g., as may be deposited into an account associated with the treasure hunter upon completion of the hunt), or the like. The manner of initiating a treasure hunt may correspond to the virtual good that will be provided upon completion thereof. For example, in the case of a gift card or an electronic money transfer, the notification may be or include an e-mail or other message indicating that such a virtual good has been sent to a user pending completion of the virtual treasure hunt. Furthermore, software used to provide a treasure hunt may, additionally or alternatively, correspond to the virtual good that will be provided upon completion thereof. For example, where the virtual good is a money transfer, a money transfer or banking app may provide the treasure hunt and/or access thereto. In another example, where the virtual good is a gift card or coupon, a virtual wallet app may provide the treasure hunt and/or access thereto.

Once the virtual treasure hunt has been initiated at the second mobile computer system 120, the second mobile computer system 120 acts to provide navigation guidance to allow the path 710 to be followed through the environment, starting from the starting point 712 through to the ending point 714.

Figure 9:
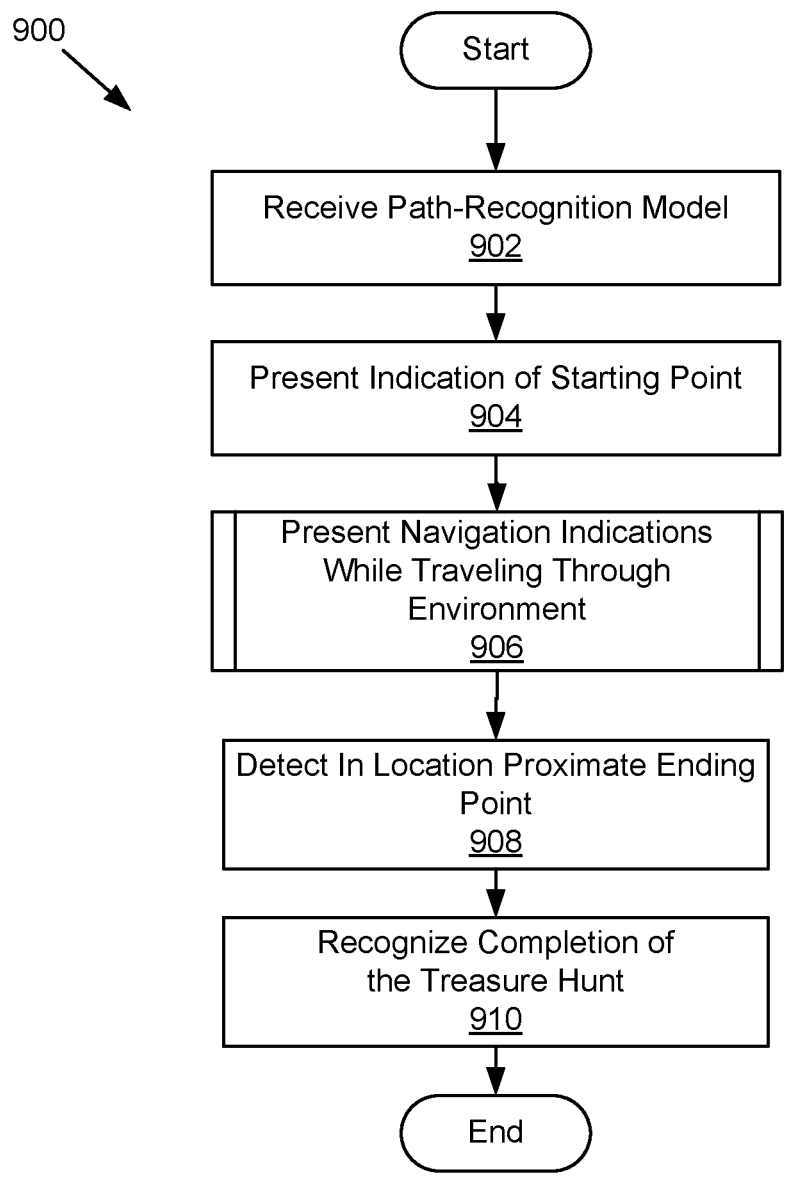
FIG. 9 is a flowchart showing operations performed in providing guidance along a path corresponding to a given treasure hunt.

FIG. 9 is a flowchart showing operations performed by the second mobile computer system 120 in providing guidance along a path corresponding to a given treasure hunts. The operation of the second mobile computer system 120 will now be described with reference to the flowchart of FIG. 9 which illustrates a method 900 for providing guidance along a path corresponding to a given treasure hunt. In performing the method 900, operations starting from an operation 902 and continuing onward are performed a processor of the second mobile computer system 120 executing stored instructions. For example, where the second mobile computer system 120 is an instance of the example mobile computer system 200, the operations may be performed by the processor 310 executing instructions such as, for example, from the memory 320. In a particular example, some or all of the operations may be performed by the processor 310 of the example mobile computer system 200 executing software such as, for example, a suitable instance of the application software 410 (FIG. 4).

At the operation 902, at least one model for recognizing locations along the path 710 is received. Put another way, the second mobile computer system 120 receives data corresponding to a model for identifying locations within the environment 700 based on images of portions of the environment 700. The model(s) may be received by the second mobile computer system 120 from a remote computer system. For example, one or more models may be received from the server computer system 110 such as, for example, via the network 130. In a particular example, where the second mobile computer system 120 is an instance of the example mobile computer system 200, the model may be received using the communications module 330. In some implementations, at least one of the received models may be compressed. For example, it may be that one or more models are compressed before it/they are sent to the second mobile computer system 120 by way of one or more operations performed by a remote computer system (e.g., the server computer system 110) including, for example, one or more of pruning, quantization, and/or encoding, if applicable. Notably, the received model(s) may correspond to a model generated according to the method 800.

Following the operation 902, an operation 904 is next.

At the operation 904, at least one indication of the starting point 712 is provided by the second mobile computer system 120. Recall that, the starting point 712 is the starting point of the path 710 and that the path 710 is the path that must be following through the environment to complete the treasure hunt. For example, where completion of the treasure hunt allows a virtual good to be obtained, presenting at least one indication of the starting point 712 has the effect of presenting one or more indications of a starting point of a path to be followed through the environment 700 to obtain the virtual good.

The second mobile computer system 120 may display an appropriate indication to the user. In a particular example, the second mobile computer system 120 may detect the starting point using the model received at the operation 902 and may provide an indication of such detection. In this way, a user viewing the display screen may learn when they are at the starting point.

In some implementations, the second mobile computer system 120 may (for example using a model received at the operation 902) provide navigation guidance allowing a user to navigate to the starting point 712.

Additionally or alternatively, it may be that the second mobile computer system 120 allows a user to identify the starting point 712 by displaying an image showing a portion of the environment 700 including and/or proximate to the starting point 712 so that a user may then navigate to that area. In some implementations, such an image may be received by the second mobile computer system 120 from the server computer system 110 and may have been extracted by the server computer system 110 from a sequence of images corresponding the path 710 as discussed above in relation to the discussion of the method 800.

Additionally or alternatively, it may be that the second mobile computer system 120 identifies the starting point 712 in another manner such as, for example, using location information. For example, where the second mobile computer system 120 is an instance of the example mobile computer system 200, the location sensor 360 may be employed in order to determine and provide an indication of a direction the second mobile computer system 120 should travel to reach the starting point 712 and/or to detect when the second mobile computer system 120 has reached the starting point 712.

The second mobile computer system 120 may detect that the second mobile computer system 120 has reached a portion of the environment 700 at or proximate to the starting point 712. In some implementations, such detection may trigger flow control to proceed to an operation 906. However triggered, following the operation 904, an operation 906 is next.

Once the second person 104 and the second mobile computer system 120 reach the starting point, the second person 104 is expected to act as a seeker trying to complete the treasure hunt. Put another way, the second person 104 is expected to try to travel along the path 710 and to bring the second mobile computer system 120 with them as they attempt to travel along the path.

At the operation 906, the second mobile computer system 120 presents navigation indications as it moves through the environment 700 (e.g., as it is carried around by the second person 104 as they navigate the environment 700 to try to complete the treasure hunt). Conveniently, in this way, the second mobile computer system 120 may assist the second person 104 in completing the treasure hunt and, more particularly, in following the path 710 through the environment 700. As further described below, in some implementations, the navigation indications may be presented in an augmented reality depiction of portions of the environment 700 as captured by an image capture module of the second mobile computer system 120.

Figure 10:
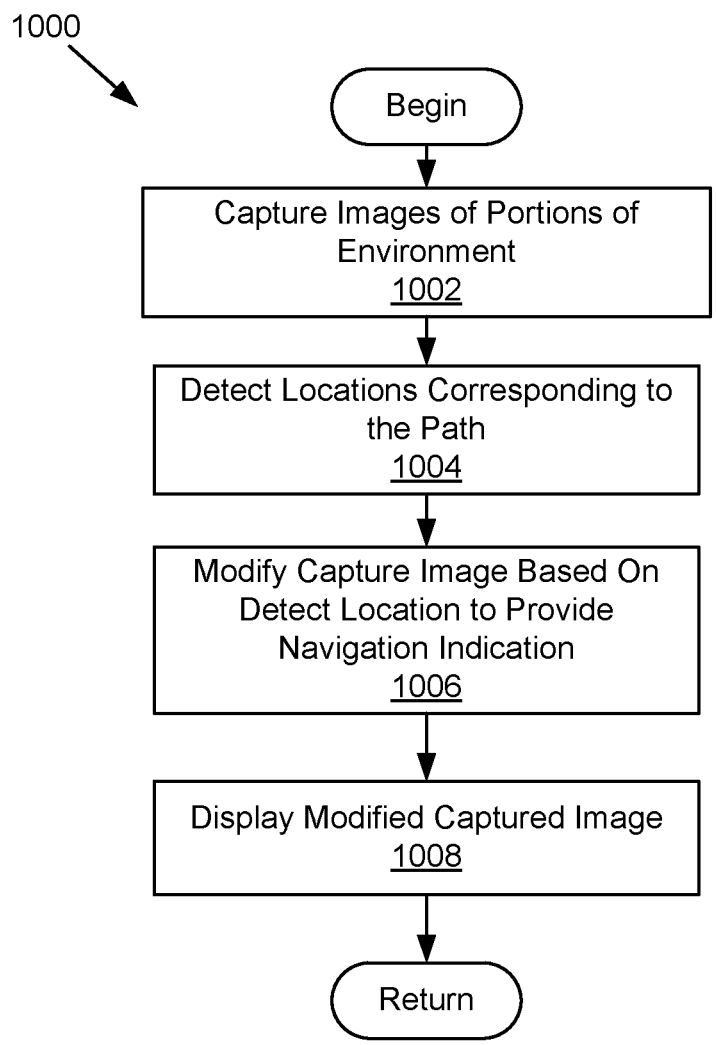
FIG. 10 is a flowchart showing operations performed in providing navigation instructions.

An example manner of presenting navigation indications is shown in FIG. 10 which provides a flowchart illustrating operations of a method 1000 for presenting navigation indications to allow the path 710 to be followed. The method 1000 may be performed as the second mobile computer system 120 travels through the environment 700 from the above-discussed location at or at least proximate to the starting point 712. In performing the method 1000, operations starting from an operation 1002 and continuing onward are performed by a processor of the second mobile computer system 120 executing stored instructions. For example, where the second mobile computer system 120 is an instance of the example mobile computer system 200, the operations may be performed by the processor 310 executing instructions such as, for example, from the memory 320 such as, for example, instructions that are part of a suitable instance of the application software 410 (FIG. 4). Notably, in some implementations, such software may be or be a part of a subroutine or module of software implementing the method 900. For example, the operations comprising the method 1000 may, in some implementations, be sub operations of the operation 906 of the method 900.

Referring to FIG. 10, at the operation 1002, images of portions of the environment 700 are captured by the second mobile computer system 120. The images may be captured using an image capture module. For example, where the second mobile computer system 120 is an instance of the example mobile computer system 200, images may be captured using the second person 104.

Figure 11:
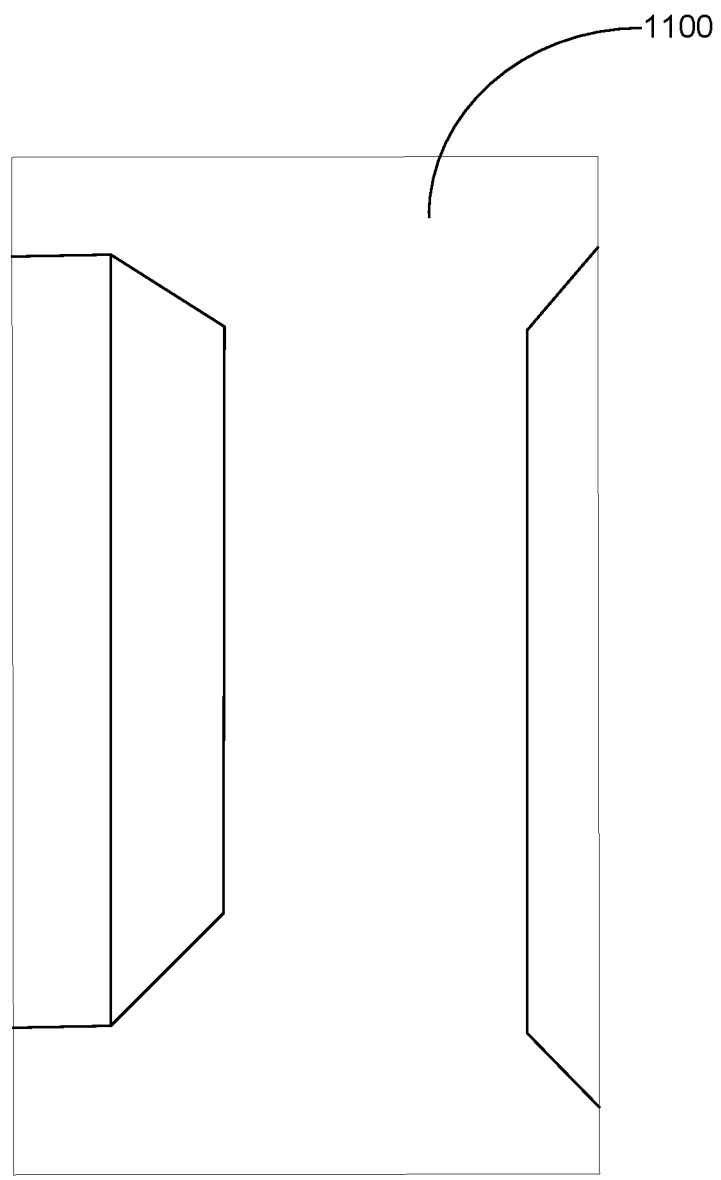
FIG. 11 provides an image showing an elevation view of a portion of the example environment of FIG. 7.

FIG. 11 shows an example image 1100 of a portion of the environment 700 such as may be captured by the second mobile computer system 120 at the operation 1002.

Returning to consideration of FIG. 10 and the method 1000, following the operation 1002, an operation 1004 is next.

At the operation 1004, locations corresponding to the path 710 are detected by the second mobile computer system 120.

Locations corresponding to the path 710 may be detected in a variety of manners.

In a first example of how locations corresponding to the path 710 may be detected by the second mobile computer system 120, it may be that locations are detected based on a model for identifying locations within the environment 700 using images showing portions of the environment 700. For example, one or more models received at the operation 902 may be employed to detect the current location of the second mobile computer system 120 based on the images of portions of the environment captured at the operation 1002.

In a second example of how locations corresponding to the path 710 may be detected by the second mobile computer system 120, it may be that locations are detected using a location module. For example, where the second mobile computer system 120 is an instance of the example mobile computer system 200, the location sensor 360 may be employed in identifying locations along the path 710. Put another way, it may be that, regardless of the form/type of location module employed, detecting locations corresponding to the path 710 includes monitoring the location of the second mobile computer system 120 using a location module.

In yet another example, in some implementations, locations corresponding to the path 710 may be detected based on a combination of techniques. For example, the foregoing example techniques may be used in combination with each other or some of all of the foregoing example techniques may be used in combination with one or more other manners of detecting locations along the path 710.

Following the operation 1004, an operation 1006 is next.

At the operation 1006, one or more of the images captured at the operation 1002 are modified based on the locations detected at the operation 1004. For a given one of the images being modified, the modifying includes compositing a given one of the captured images with a navigation indication corresponding to a direction of the path 710 relative to a detected location corresponding to the path 710. More particularly, a given captured image may be modified to include a navigation indication corresponding to a direction of the path 710 relative to the location of the second mobile computer system 120 as detected at a time at or about (i.e., temporally proximate to) the collection of the given image by the second mobile computer system 120.

Following the operation 1006, an operation 1008 is next.

At the operation 1008, the modified one or more of the captured images are displayed using a display module of the example mobile computer system 200. For example, where the second mobile computer system 120 is an instance of the example mobile computer system 200, modified images may be displayed on/using the display 202.

Conveniently, by so modifying and presenting captured images to include navigation indications, navigation indications can be presented in augmented reality. An example of modification of a captured image to include a navigation indication will now be discussed with reference to FIG. 12.

Figure 12:
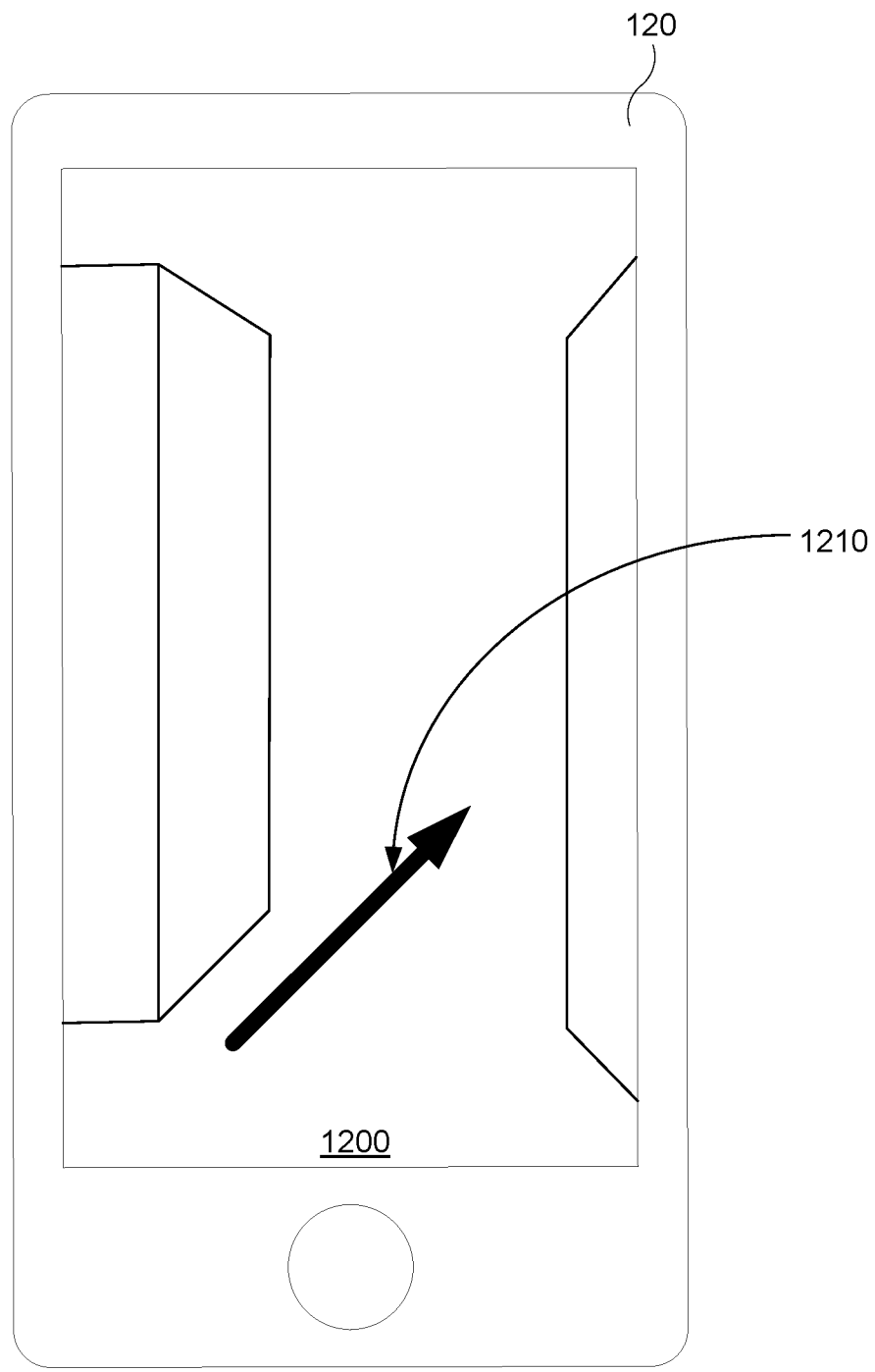
FIG. 12 shows an example screen display providing navigation guidance along a path corresponding to the example treasure hunt through the example environment of FIG. 7.

FIG. 12 shows a user interface 1200 such as may be shown on a screen of the second mobile computer system 120. As illustrated, the user interface 1200 corresponds to the example image 1100 (FIG. 11). However, in the user interface 1200, the example image 1100 has been modified (e.g., at the operation 1006) with the addition of a navigation indication 1210. In effect, the navigation indication 1210 is present in an augmented reality depiction of the portion of the environment 700 depicted in the example image 1100.

As illustrated, the navigation indication 1210 is an arrow indicating a direction that the second mobile computer system 120 (and the second person 104) should next travel to follow the path 710. Put another way, navigation indications such as the navigation indication 1210 may include arrows indicating a direction for the second mobile computer system 120 and the second person 104 to next travel to follow the path 710. Additionally or alternatively, such navigation indications may include instructive text and/or direction symbols other than arrows.

The discussion now returns to consideration of FIG. 9. However they are presented, following presentation of navigation indications at the operation 906, an operation 908 is next.

As the second mobile computer system 120 (and the second person 104) continue to follow the path 710, it (and they) will be expected to eventually reach the ending point 714. Put another way, if the second person 104 successfully uses the navigation guidance provided by the second mobile computer system 120 to follow the path 710, the second person 104 will eventually complete the treasure hunt.

The second mobile computer system 120 reaching the ending point 714 or a location proximate thereto is detected at the operation 908.

That the second mobile computer system 120 is in a location proximate the ending point 714 of the path 710 may be detected in a variety of manners. For example, that the second mobile computer system 120 is proximate the ending point 714 may be detected in manners the same or similar to how manners how the second mobile computer system 120 being at the starting point 712 may be detected as discussed above in relation to the operation 904.

In a first example of a manner of detecting that the second mobile computer system 120 is proximate the ending point 714 of the path 710, such a condition may be detected using a model for recognizing locations along the path 710 based on captured images of portions of the environment 700 (e.g., using a model received at the operation 902). More specifically, such a model may be employed in order to detect that the second mobile computer system 120 is in a location proximate the ending point 714 based on a captured image of the environment 700. For example, where the operation 906 includes performance of the method 1000 as discussed above, the second mobile computer system 120 being at or proximate to the ending point 714 may be detected using a model and based on one or more images captured at the operation 1002.

In a second example of a manner of detecting that the second mobile computer system 120 is proximate the ending point 714 of the path 710, such a condition may be detected based on the location of the second mobile computer system 120 as monitored using a location module. For example, where the second mobile computer system 120 corresponds to an instance of the example mobile computer system 200, the second mobile computer system 120 being proximate the ending point 714 may be detected using the location sensor 360.

However detected, following detection that the second mobile computer system 120 is at or proximate the ending point 714 of the path 710, an operation 910 is next.

At the operation 910, the processor of the second mobile computer system 120 effects and/or triggers one or more side-effects intended to recognize the completion of the treasure hunt by the second person 104.

For example, in some implementations, at the operation 910, an account associated with the second mobile computer system 120 may be updated responsive to detecting at the operation 908 that the second mobile computer system 120 is in a location proximate the ending point 714.

Such an update may take a variety of forms. For example, where completion of the treasure hunt allows a virtual good to be obtained as discussed above, the account may be updated to associate the virtual good with the account. That virtual good may, for example, have been supplied by the party (e.g., the first person 102) responsible for defining the treasure hunt and/or drawn from an account associated with a device that was employed for specifying the treasure hunt (e.g., the first mobile computer system 100). Additionally or alternatively, it may be that the account being updated corresponds to a virtual wallet. For example, it may be that the account is an account used with a virtual wallet app that allows the contents of a particular virtual wallet to be accessed. Such a virtual wallet app may, for example, be installed and/or executing on the second mobile computer system 120 and the second person 104 may be logged into their account in that app. Additionally or alternatively, the virtual good that can be obtained may be or may include a virtual gift card. For example, where the account corresponds to a virtual wallet and the virtual good is or includes a virtual gift card, the side effect may/include be an update to the aforementioned account associated with the second mobile computer system 120 such as, for example, to add the virtual gift card to the virtual wallet. Alternatively, such as, for example, where the user already has some other virtual gift card, the virtual good may include additional value to be added to an existing gift card such as, for example, an existing gift card in a virtual wallet and the side effect may be or/include the addition of that additional value to the existing gift card. In another example, the virtual good may include points (e.g., loyalty points) and the side effect may be/include the addition of those points to an existing points card/virtual points card/points card account. Notably such a virtual points card may also reside in a virtual wallet and/or may be added thereto in manners such as, for example, were discussed above in relation to virtual gift cards.

Furthermore, as mentioned above, it may be that the virtual good has only been selected (and not purchased or otherwise acquired or allocated) prior to initiation of the hunt. Accordingly, it may be that, additionally or alternatively, the virtual good is procured and/or generated responsive to completion of the treasure hunt. For example, in the case where the virtual good must be purchased (e.g., as with, for example, a virtual gift card) previously received payment information (e.g., bank account and/or payment card information as discussed above) may be used to complete the purchase. Notably, where a hold or authorization was previously obtained in an effort to assure that such a purchase could be completed, it may be that completion of the purchase has an effect and/or is performed relative to such a hold or authorization. For example, completion of the purchase may cause a hold on funds to be released. In another example, it may be that the purchase is completed against a previously-obtained authorization.

In another example of a side-effect intended to recognize completion of the treasure hunt, it may be that, responsive to detecting that the second mobile computer system 120 is in a location proximate the ending point 714, the second mobile computer system 120 may display, using a display module thereof, an animation. For example, in implementations where the second mobile computer system 120 is an instance of the example mobile computer system 200, such an animation may be displayed using the display 202.

Figure 13A:
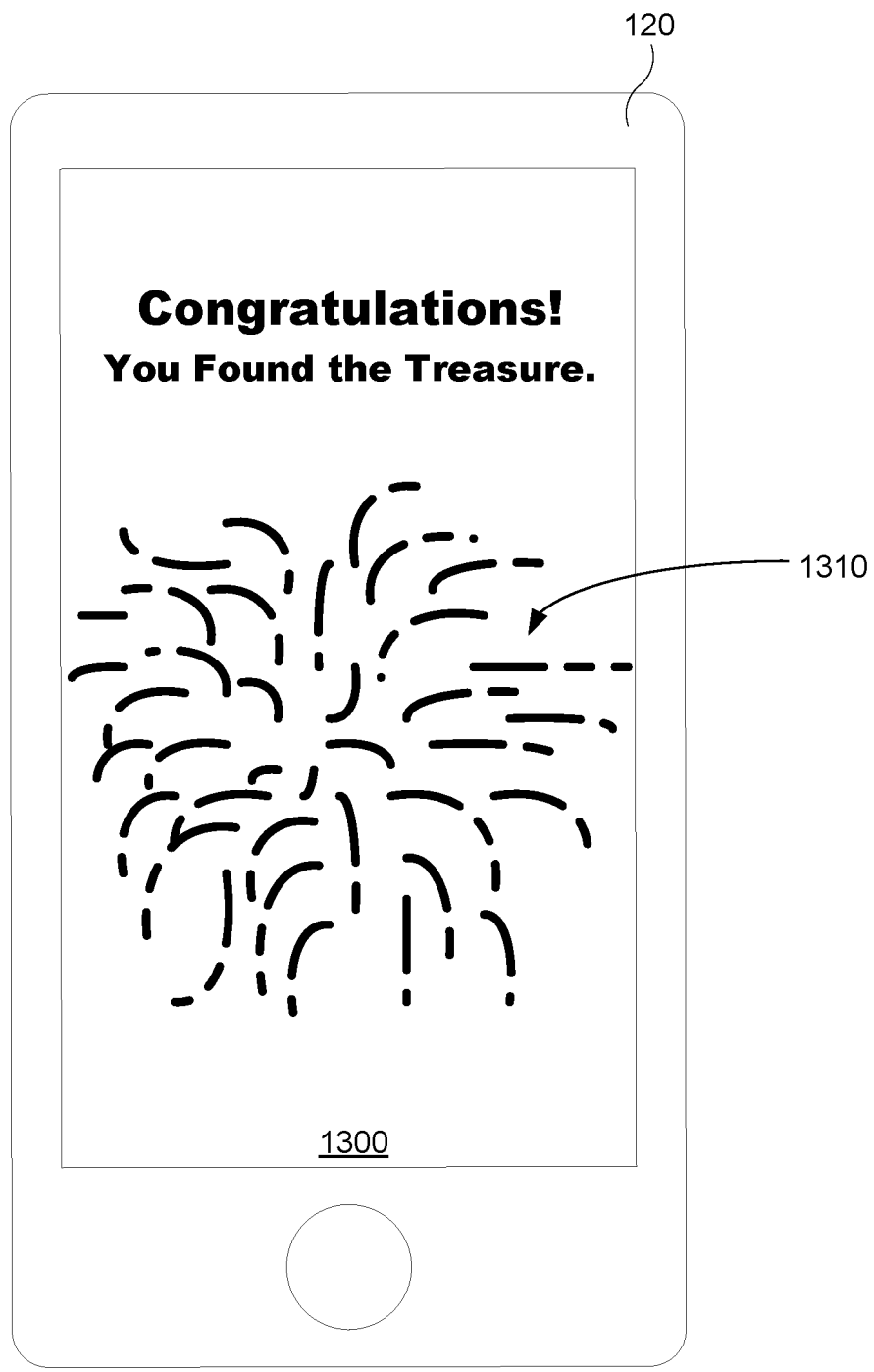
FIGS. 13A and 13B show example screen displays such as may be provided upon arrival at a treasure.

Such an animation may take a variety of forms. For example, as shown in FIG. 13A, a first example user interface 1300 may be presented upon completion of the treasure hunt that includes an animation 1310 of fireworks going off.

Figure 13B:
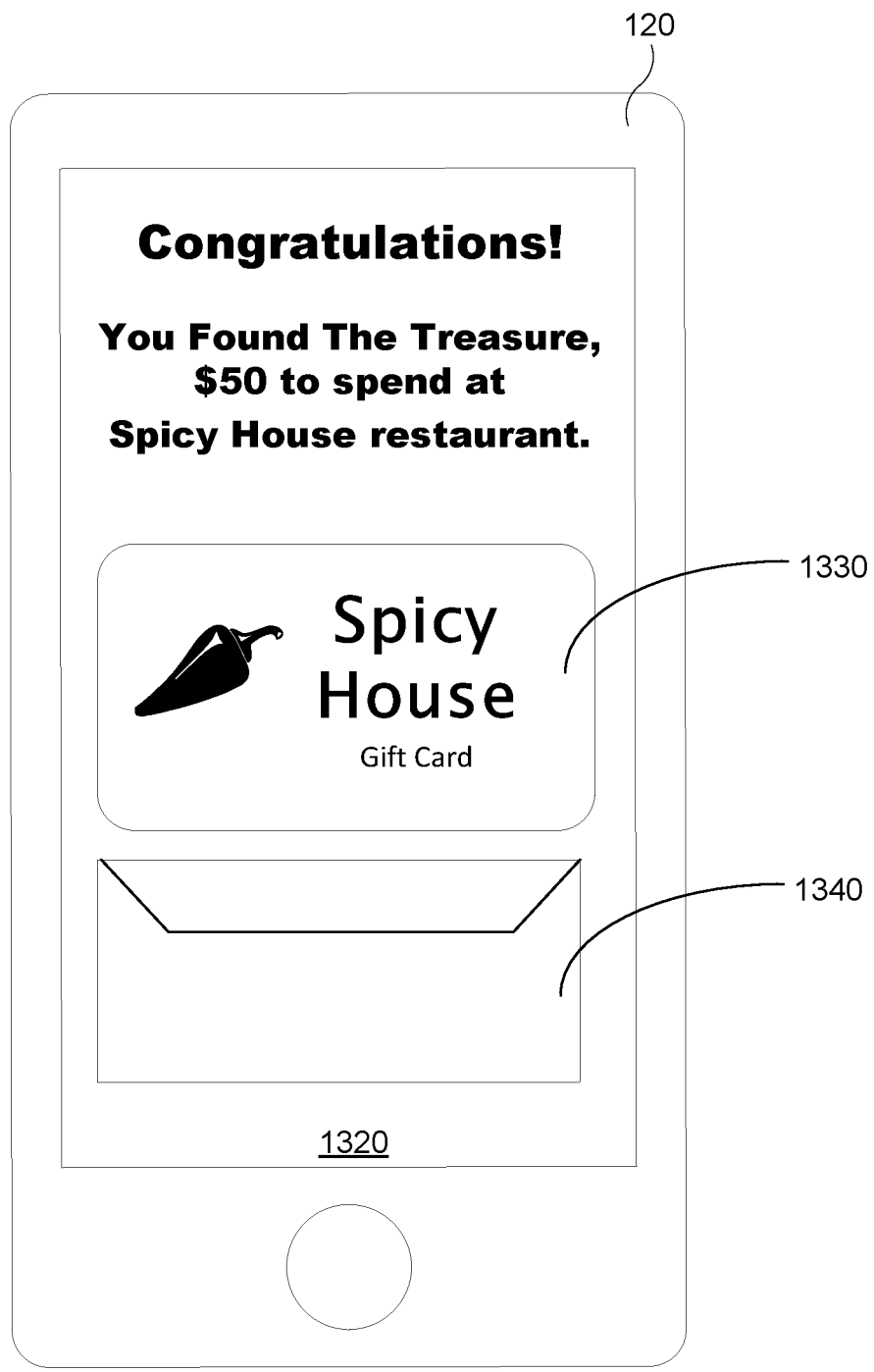

In another example, where the treasure is a gift card as discussed above, an animation may be presented such as that depicted in a second example user interface 1320 in FIG. 13B. As illustrated, the second example user interface 1320 includes an animation of a gift card 1330 flying or being placed in a wallet 1340.

Whatever the form of the animations, in some implementations such an animation may be composited with one or more images of a portion of the environment 700 captured as the second mobile computer system 120 as it is at or proximate the ending point 714. Notably, by compositing and presenting such images on a display of the second mobile computer system 120 in real-time or near real-time, the animation may made to appear as if was occurring in the environment 700 as viewed through the display of the second mobile computer system 120. Put another way, in some implementations, the animation may be presented in augmented reality.

The above is by way of example only. A skilled person having regard to the discussion of example embodiments above will recognize that those example embodiments are capable of variation without departing from the subject matter of the present application. For example, in some implementations, a user may be provided with additional guidance in navigating the treasure hunt. Such additional guidance may take the form of providing a virtual treasure map. Such a map may be presented on a screen of the second mobile computer system 120 such as, for example, responsive to input received by the second mobile computer system 120 (e.g., as may be provided by the second person 104).

Figure 14:
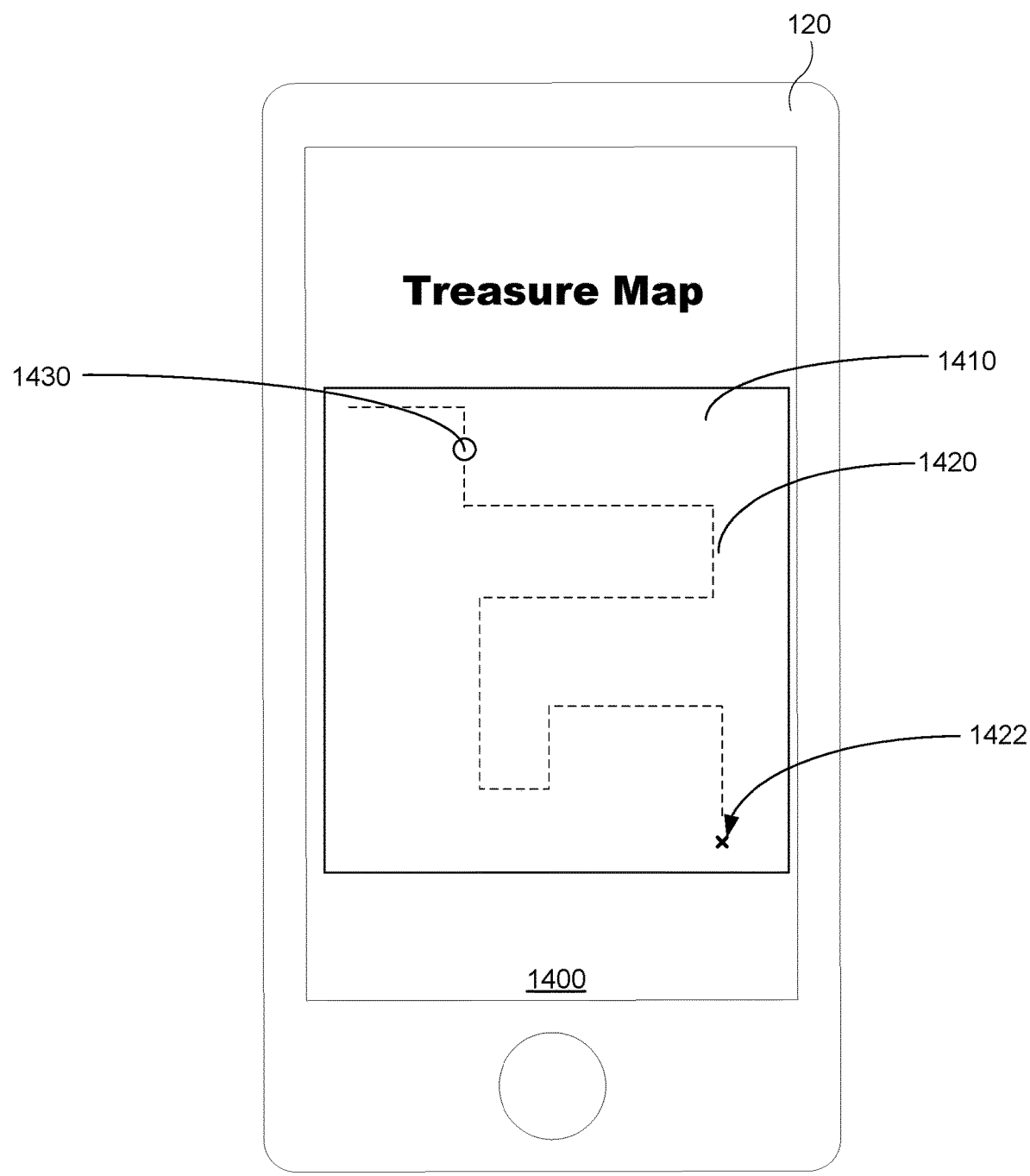
FIG. 14 shows an example screen display providing a treasure map corresponding to the path corresponding to the example treasure hunt through the example environment of FIG. 7.

An example virtual treasure map is shown in FIG. 14. As shown, the second mobile computer system 120 may display a treasure map user interface 1400. The treasure map user interface 1400 includes a representation of a treasure map 1410. Such a presented treasure map may provide various information about the path 710. For example, as illustrated, the treasure map 1410 may include a depiction 1420 of the path 710. Additionally or alternatively, the treasure map 1410 may, as shown in FIG. 14, include a symbol 1422 depicting the ending point 714 of the path 710 relative to the depiction 1420 of the path 710. Additionally or alternatively, in some implementations, a treasure map may include a symbol depicting the starting point 712 of the path 710 (not shown in FIG. 14). Additionally or alternatively, the treasure map 1410 may include a current position indication 1430 indicating the current position of the second mobile computer system 120 in the environment 700 relative to path 710. In summary, a treasure map user interface may depict a treasure map including some or all of the aforementioned possible visual elements.

A treasure map may be generated in a variety of manners. For example, it may be that such a map is generated based on the path 710 by a server such as, for example, the server computer system 110 and is then sent to (and received by) the second mobile computer system 120 in advance of the start of the hunt (e.g., via the network 130). In a particular example, the server computer system 110 may generate a treasure map based on location data and/or a sequence of images such as were, for example, collected by another electronic device (e.g., the first mobile computer system 100) as it travelled through the environment 700 along the path 710 (e.g., collected as discussed above in relation to the operation 802 of the method 800).

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A mobile computer system comprising:
 a processor;
 an image capture module coupled to the processor;
 a display module coupled to the processor; and
 a memory module coupled to the processor and storing instructions that, when executed by the processor, cause the mobile computer system to:
 receive data corresponding to an image-recognition model for identifying locations within an environment based on images of portions of the environment, the image-recognition model being previously generated based on a video captured by another electronic device as the another electronic device travelled through the environment along a path through the environment;
 present one or more indications of a starting point of the path to be followed through an environment to obtain a virtual gift card;
 as the mobile computer system travels through the environment from a location proximate the starting point, present navigation indications to allow the path to be followed, the presenting including:
  capturing, using the image capture module, images of portions of the environment;
  detecting locations corresponding to the path, including identifying one or more locations within the environment based on the captured images using the image-recognition model;
  modifying one or more of the captured images based on the detected locations corresponding to the path, the modifying including compositing a given captured image with a navigation indication corresponding to a direction of the path relative to a corresponding detected location corresponding to the path; and
  displaying, using the display module, the modified one or more of the captured images;
 detect that the mobile computer system is in a location proximate an ending point of the path; and
 responsive to detecting that the mobile computer system is in the location proximate the ending point, update an account associated with the mobile computer system to associate the virtual gift card with the account.

2. The mobile computer system of claim 1, wherein that the mobile computer system is in the location proximate the ending point of the path is detected using the model based on at least one of the captured images of portions of the environment.

3. The mobile computer system of claim 1, wherein the mobile computer system further includes a location module and wherein detecting locations corresponding to the path includes monitoring the location of the mobile computer system using the location module.

4. The mobile computer system of claim 3, wherein that the mobile computer system is in the location proximate the ending point of the path is detected based on the location of the mobile computer system as monitored using the location module.

5. The mobile computer system of claim 1, wherein the navigation indications include arrows indicating a direction to next travel to follow the path.

6. The mobile computer system of claim 1, wherein the instructions, when executed by the processor, further cause the mobile computer system to:
 responsive to detecting that the mobile computer system is in the location proximate the ending point, display, using the display module, an animation.

7. The mobile computer system of claim 1, wherein the instructions, when executed by the processor, further cause the mobile computer system to:
 display, using the display module, a map depicting at least the ending point of the path.

8. The mobile computer system of claim 7, wherein the map was previously generated based on location data previously collected by another electronic device as the another electronic device travelled through the environment along the path through the environment.

9. The mobile computer system of claim 1, wherein the account corresponds to a virtual wallet.

10. The mobile computer system of claim 9 wherein updating the account associated with the mobile computer system to associate the virtual gift card with the account includes adding the virtual gift card to the virtual wallet.

11. A computer-implemented method comprising:
 receiving data corresponding to an image-recognition model for identifying locations within an environment based on images of portions of the environment, the image-recognition model being previously generated based on a video captured by another electronic device as the another electronic device travelled through the environment along a path through the environment;
 presenting one or more indications of a starting point of the path to be followed through an environment to obtain a virtual gift card;
 as a mobile computer system travels through the environment from a location proximate the starting point, presenting navigation indications to allow the path to be followed, the presenting including:

capturing, by the mobile computer system, images of portions of the environment;

detecting locations corresponding to the path, including identifying one or more locations within the environment based on the captured images using the image-recognition model;

modifying one or more of the captured images based on the detected locations corresponding to the path, the modifying including compositing a given captured image with a navigation indication corresponding to a direction of the path relative to a corresponding detected location corresponding to the path; and displaying, using a display of the mobile computer system, the modified one or more of the captured images;

detecting that the mobile computer system is in a location proximate an ending point of the path; and responsive to detecting that the mobile computer system is in the location proximate the ending point, updating an account associated with the mobile computer system to associate the virtual gift card with the account.

12. The computer-implemented method of claim 11, wherein that the mobile computer system is in the location proximate the ending point of the path is detected using the model based on at least one of the captured images of portions of the environment.

13. The computer-implemented method of claim 11, wherein detecting locations corresponding to the path includes monitoring the location of the mobile computer system using a location module of the mobile computer.

14. The computer-implemented method of claim 11, further comprising:
responsive to detecting that the mobile computer system is in the location proximate the ending point, displaying, using the display, an animation.

15. The computer-implemented method of claim 11, wherein the account corresponds to a virtual wallet and wherein updating the account associated with the mobile computer system to associate the virtual gift card with the account includes adding the virtual gift card to the virtual wallet.

16. A non-transitory computer-readable storage medium storing instructions that, when executed by a processor of a mobile computer system, cause the computer system to:
receive data corresponding to an image-recognition model for identifying locations within an environment based on images of portions of the environment, the image-recognition model being previously generated based on a video captured by another electronic device as the another electronic device travelled through the environment along a path through the environment;
present one or more indications of a starting point of the path to be followed through an environment to obtain a virtual gift card;
as the mobile computer system travels through the environment from a location proximate the starting point, present navigation indications to allow the path to be followed, the presenting including:
capturing images of portions of the environment;
detecting locations corresponding to the path, including identifying one or more locations within the environment based on the captured images using the image-recognition model;
modifying one or more of the captured images based on the detected locations corresponding to the path, the modifying including compositing a given captured image with a navigation indication corresponding to a direction of the path relative to a corresponding detected location corresponding to the path; and
displaying the modified one or more of the captured images;
detect that the mobile computer system is in a location proximate an ending point of the path; and
responsive to detecting that the mobile computer system is in the location proximate the ending point, update an account associated with the mobile computer system to associate the virtual gift card.

17. The non-transitory computer-readable storage medium of claim 16, wherein the navigation indications include arrows indicating a direction to next travel to follow the path.

18. The non-transitory computer-readable storage medium of claim 16, wherein the instructions, when executed by a processor of a mobile computer system, further cause the computer system to:
display, using a display module, a map depicting at least the ending point of the path, wherein the map was previously generated based on location data previously collected by another electronic device as the another electronic device travelled through the environment along the path through the environment.

19. The non-transitory computer-readable storage medium of claim 16, wherein that the mobile computer system is in the location proximate the ending point of the path is detected using the model based on at least one of the captured images of portions of the environment.

20. The non-transitory computer-readable storage medium of claim 16, wherein the mobile computer system further includes a location module and wherein detecting locations corresponding to the path includes monitoring the location of the mobile computer system using the location module.

21. The non-transitory computer-readable storage medium of claim 16, wherein the account corresponds to a virtual wallet.

22. The non-transitory computer-readable storage medium of claim 21, wherein updating the account associated with the mobile computer system to associate the virtual gift card with the account includes adding the virtual gift card to the virtual wallet.

* * * * *